J. MAILLET.
AGRICULTURAL MACHINE.
APPLICATION FILED APR. 19, 1916.

1,284,122.

Patented Nov. 5, 1918.
3 SHEETS—SHEET 1.

Witnesses

J. Maillet.
Inventor

By
Attorney.

J. Maillet.
Inventor

J. Maillet
Inventor

UNITED STATES PATENT OFFICE.

JOANNY MAILLET, OF LAIZ PRES PONT-DE-VEYLE, FRANCE.

AGRICULTURAL MACHINE.

1,284,122.   Specification of Letters Patent.   Patented Nov. 5, 1918.

Original application filed June 4, 1915, Serial No. 32,100. Divided and this application filed April 19, 1916. Serial No. 92,181.

*To all whom it may concern:*

Be it known that I, JOANNY MAILLET, a citizen of the French Republic, and residing at Laiz pres Pont-de-Veyle, in the Department of Ain, France, have invented certain new and useful Improvements in Agricultural Machines, of which the following is a specification.

This invention relates to agricultural machines and it is the principal object thereof to provide an improved agricultural machine particularly adapted for work in vineyards or other places where the crops are cultivated in rows.

It is another object of the invention to provide a machine of that kind in which the driving wheels (which with the tilling implement—generally a rotary one—form the support for the machine) are adapted for such movement relatively to the frame or body of the machine that they can act as a guiding means by changing the angular position of their axis relatively to the machine as a whole, and in particular in relation to the axis of the tilling implement.

It is another object of the present invention to provide a motor driven agricultural machine in which the driving axle, notwithstanding its power transmission mechanism in connection with the motor, is resiliently mounted on the vehicle.

It is a further object of the invention to provide a motor driven agricultural machine having wheels the axis of which is movable universally about a central point of the said axis between the wheels, the power being communicated to the wheels from the motor through the said central point.

It is a further object of the present invention to provide an agricultural machine having a motor, a resiliently connected driving and guiding axle and a power operated rotary tilling implement in which the speed of travel relatively to the speed of the motor can be varied and in which the speed of rotation of the tilling implement relatively to the speed of travel can be varied.

In the accompanying drawings which illustrate a preferred embodiment of the present invention:—

Figure 1:
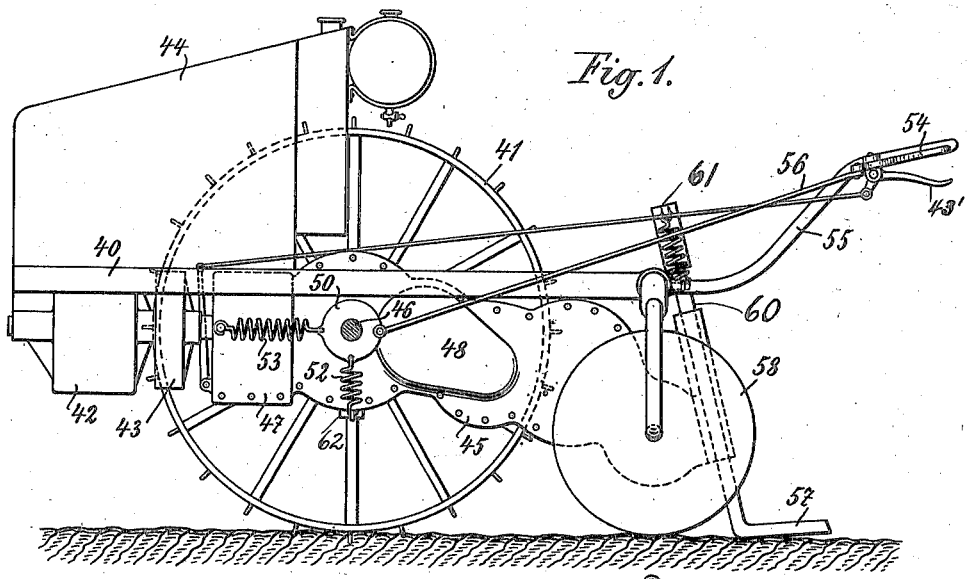
Figure 1 is a side elevation of the improved vehicle.

The machine shown in the drawings consists essentially of a motor vehicle carrying the tools and of a plowing or tilling apparatus proper.

The tool-carrying vehicle comprises a carriage 40 mounted on wheels 41 and carrying the motor 42 and clutch device 43.

The motor 42 and the clutch mechanism 43 are arranged under a hood or bonnet 44. A single gear case 45 which incloses all the parts for transmitting motion and changing the speed, is traversed by the axle 46. A first change speed gear 47 within the casing is situated in the front of the gear case aforesaid and regulates the speed of the machine as a whole relatively to the speed of the motor without changing the speed ratio between the driving wheels and the plow.

A second speed changing gear 48 located at the side of the gear case is adapted to alter the speed ratio between the driving wheels 41 and the working implement 58.

Figure 5:
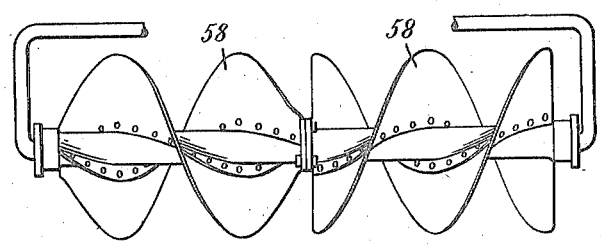
Fig. 5 is an elevation of the tilling implement detached.
Figure 6:
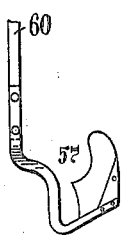
Figs. 6 and 7 are two views respectively at right angles with one another of the slicing implements hereinafter described.
Figure 7:
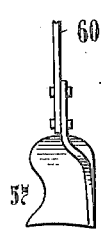

The tool 58 is arranged at the rear of the gear case. It comprises two sections, as shown in Fig. 5, one with a right-hand screw thread and the other with a left-hand screw thread. The two sections are interchanged according as it is desired to throw up or to throw down a ridge.

These change speed gears can be of any suitable construction, and as they are well known and do not in themselves form part of the present invention, need not be described in detail herein.

The engine preferably runs at a constant speed of rotation, and the change speed gears should, for preference, have two changes of speed. I have found in practice that the most advantageous kinematic arrangement of the machine is one in which the following ratios can be obtained between the speed of advance and the speed of rotation of the tool for a given number of revolutions of the motor.

| Advance. | Tool. |
|---|---|
| 30 meters | 90 revs. |
| 40 " | 90 " |
| 41 " | 130 " |
| 55 " | 130 " |

This represents a working of the soil which varies from a thin slice to a wide strip, or, in other terms, from fine pulverization to very coarse granulation.

Figure 2:
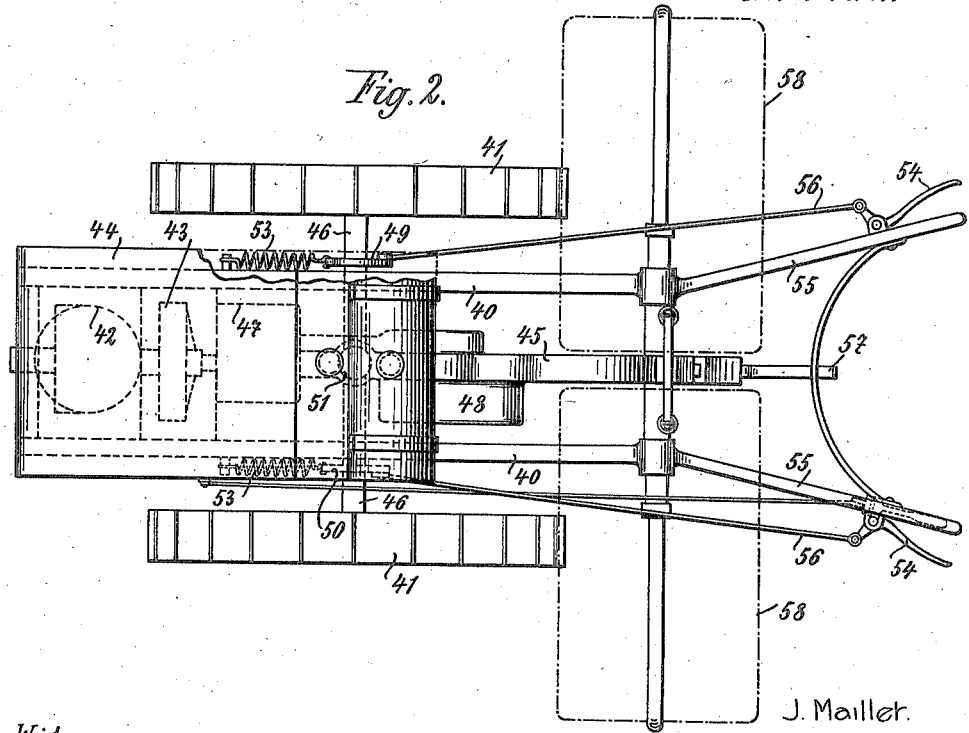
Fig. 2 is a plan view of same.
Figure 3:
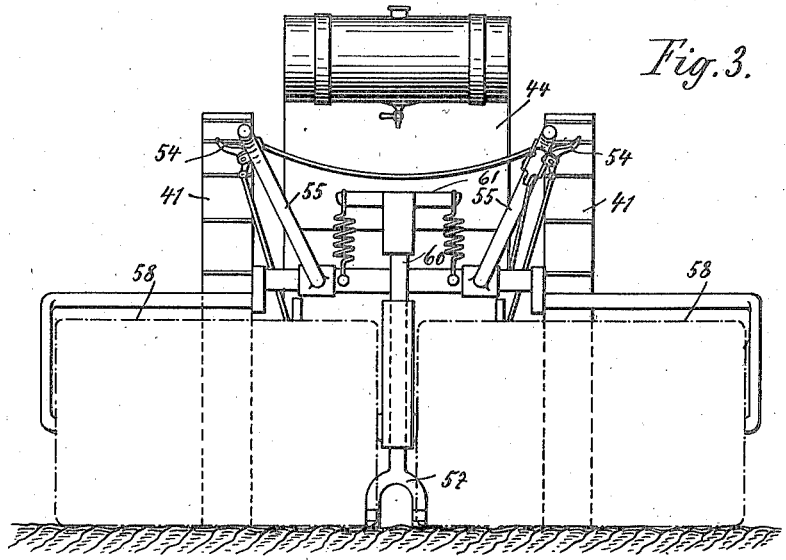
Figs. 3 and 4 are respectively rear and front elevations of the machine.
Figure 4:
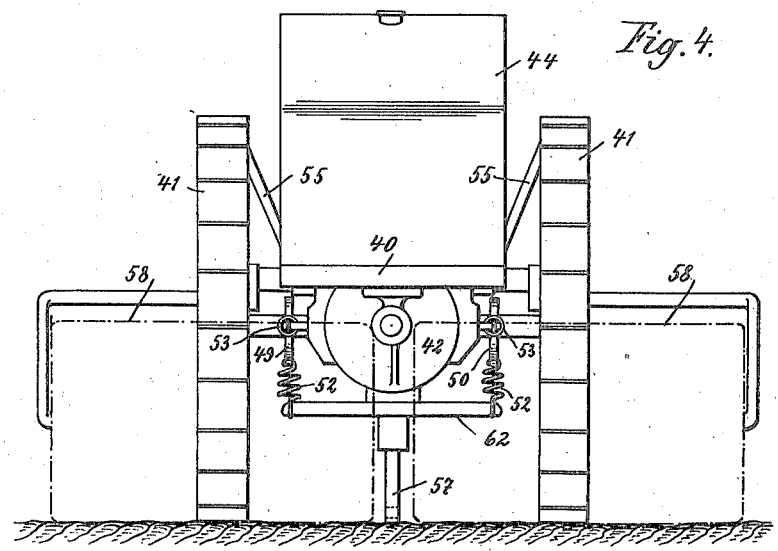

The axle 46 revolves in bearings 49 and 50 (see Figs. 1, 2 and 9) supported by springs hereinafter referred to and is driven at its center by means of a ball and socket hub 51, shown in section in Fig. 8, which is capable of yielding in every direction so as to allow the wheels to follow all the undulations of the ground without affecting the level position of the apparatus, or, especially, that of the tools. In addition this arrangement permits of changing the direction of travel without hindering the working of the tools.

Two vertical springs 52 keep the axle parallel to the plane of the apparatus on level ground. One end of each spring is connected to the respective end of a cross bar 62 (Fig. 9) carried upon an adjacent part of the machine, and the other end of each spring is attached to the bearing 50. On uneven ground these springs allow the wheels to follow the surface without materially changing the position of the apparatus in the lateral sense. Two other springs 53, acting horizontally, each attached by its ends to a part of the machine and the bearing 50 respectively, maintain the wheels substantially parallel to the carriage. In order to direct the apparatus on to its work, it is merely necessary to act upon the said springs by means of handles 54 fixed on the arm pieces 55 and attached to the springs 53 by rods 56. Upon these arm pieces may be fitted controls for the motor and the speed changing mechanisms the clutch control being designated 43'. They also allow the operator to effect the engagement or disengagement of the tools with the soil and also to turn the machine if desired. 57 is a slide shoe fitted with a stem 60 for regulating the depth of the working and for keeping the machine straight. For ridge working this shoe forms a slicer for working the portion of ground situated between the two tools. The upper end of the stem has a spring suspension 61—firstly for permitting the tools to be engaged with the soil by manual pressure upon the hand holding members when the spring suspension 61 yields during the entry in the soil, resuming its position as soon as such pressure ceases; secondly when it is required to till a difficult section the driver is able to exert pressure upon the tools.

Figure 8:
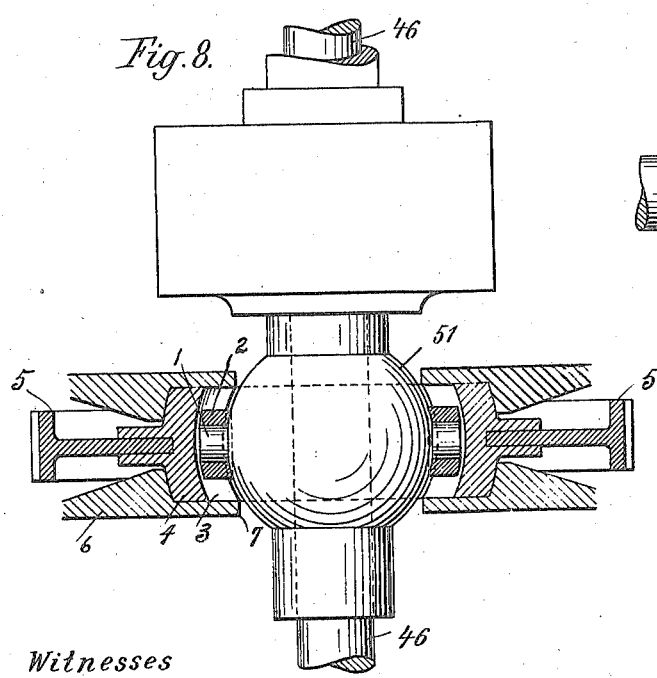
Fig. 8 is a sectional view of a ball and socket hub.
Figure 9:
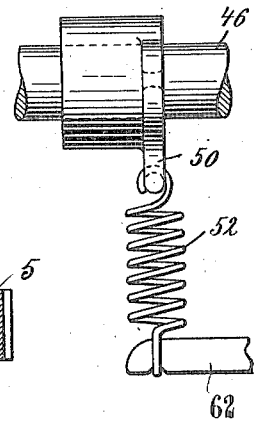
Fig. 9 is a view of a spring suspension; both of these latter figures are drawn to an enlarged scale.

As best shown in Fig. 8, the ball 51 of the axle 46, is provided with two diametrically opposite studs 1 carrying rollers 2. These rollers movably engage curved guides 3 carried by the curved hub 4, of a gear 5 that is driven from the engine by means included in the change speed gear 47.

The hub 4 is mounted for vertical rotation in bearings 6 and the inner ends 7 of these bearings close the ends of the guides 3 to prevent the escape of the rollers 2. With this construction a universal joint or drive will be provided between the engine and axle.

Having now described my invention, what I claim as new and desire to secure by Letters Patent is:—

1. An agricultural machine comprising a motor driven vehicle having a pair of driving wheels, a ball and socket hub at the center of the driving axle thereof through which the driving power is transmitted, spring mountings for the driving axle, a resiliently mounted sliding support for the vehicle, a power operated tilling implement, means for varying the speed of travel and means for varying the speed of operation of the tilling implement.

2. An agricultural machine comprising a motor driven vehicle having a pair of driving wheels, a ball and socket hub at the center of the axle thereof through which the driving power is transmitted, vertically acting spring mountings for the driving axle, a resiliently mounted sliding support for the rear of the vehicle, a rotary tilling implement, means for varying the speed of travel and means for varying the speed of operation of the rotary tilling implement.

3. An agricultural machine comprising a motor driven vehicle having a pair of oppositely arranged driving wheels, a ball and socket hub at the center of the axle thereof through which the driving power is transmitted, a pair of horizontally arranged springs for restraining relative rearward movement of the wheels, a pair of manual control levers for moving the wheels independently backward to steer the machine, a pair of vertically arranged springs to resist relative upward movement of the wheels, a resilient rear support for the machine, a power driven rotary tilling implement, means for varying the speed of travel of the machine, and means for varying the speed ratio between the driving wheels and the tilling implement.

In testimony whereof I have signed my name to this specification.

JOANNY MAILLET.

Witnesses:
  J. E. JONES,
  JOHN J. ERNSTER.